United States Patent [19]

Williamson et al.

[11] Patent Number: 5,032,297

[45] Date of Patent: Jul. 16, 1991

[54] ENZYMATICALLY DEGRADABLE FLUID LOSS ADDITIVE

[75] Inventors: Charles D. Williamson, Sugar Land; Stephan J. Allenson, Richmond; Robert K. Gabel, Houston; David A. Huddleston, Sugar Land, all of Tex.

[73] Assignee: Nalco Chemical Company, Naperville, Ill.

[21] Appl. No.: 354,042

[22] Filed: May 19, 1989

[51] Int. Cl.$^5$ .................................................. C09K 7/02
[52] U.S. Cl. .................................. 252/8.551; 166/246; 166/305.1; 252/8.51
[58] Field of Search ............................. 166/246, 305.1; 252/8.551

[56] References Cited

U.S. PATENT DOCUMENTS

| | | | |
|---|---|---|---|
| 3,251,768 | 5/1966 | Walker | 252/8.51 |
| 3,765,918 | 10/1973 | Jordan et al. | 106/205 |
| 3,933,788 | 1/1976 | Kang et al. | 252/8.51 |
| 3,953,336 | 4/1976 | Daigle | 252/8.51 |
| 3,979,303 | 9/1976 | Kang et al. | 252/8.554 X |
| 3,988,246 | 10/1976 | Hartfiel | 252/8.51 |
| 4,326,037 | 4/1982 | Griffith et al. | 435/274 |
| 4,468,334 | 8/1984 | Cox et al. | 252/8.51 X |
| 4,682,654 | 7/1987 | Carter et al. | 166/308 |
| 4,693,982 | 9/1987 | Carter et al. | 435/274 |

Primary Examiner—Robert L. Stoll
Assistant Examiner—Chhaya Sayala
Attorney, Agent, or Firm—John S. Roberts, Jr.; Donald G. Epple

[57] ABSTRACT

In treating oil well down hole bores, a method of treating subterranean formations by fracturing by utilization of a fluid loss additive (FLA) comprising starch or a mixture of natural and modified starches plus an enzyme which degrades the alpha linkage of starch and does not the degrade the beta linkage of guar and modified guar where used as a viscosity modifier. Natural/modified starches are utilized in a preferred ratio of 3:7 to 7:3 or 1:9 to 9:1 with optimum at 1:1, and the mix is used in the dry form for application from the surface down the bore hole.

11 Claims, No Drawings

ENZYMATICALLY DEGRADABLE FLUID LOSS ADDITIVE

BACKGROUND OF THE INVENTION

This invention relates generally to an additive and a method for improving the efficiency of hydraulic fracturing operations conducted in subterranean formations penetrated by a wellbore. It often becomes necessary or desirable to exploit modern technology to increase the rate of fluid flow in wellbores for the production of oil or gas. A common technique for increasing the rate of fluid flow comprises fracturing the subterranean formation adjacent to the wellbore by pumping a fracturing fluid into the wellbore at a pressure sufficient to lift the overburden and fracture the formation. Proppants in the form of uniform size sand, resin coated sand or glass beads are pumped with the fracturing fluid and fill the fracture with porous material to prevent reclosure once hydraulic pressure is released.

In hydraulic fracturing operations, it is important that the fracturing fluid not penetrate into the formation, since the penetration would limit the efficiency of the fracturing process and damage the formation. Penetration of the fracturing fluid typically is controlled by incorporating a fluid loss control additive in the fracturing media.

A variety of different fluid loss control additives are known and used. These include finely divided inorganics such as silica flour, crushed limestone, rocksalt, talc, kaolin and bentonite. These materials are generally insoluble in aqueous hydraulic fluids and tend to plate out and plug the face of the subterranean formation to form an effective filter cake, however, since these materials are inert, they can permanently plug the formation pore spaces, thereby reducing the flow of fluids into the wellbore. Also, many known fluid control additives have poor "spurt loss" characteristics because the filter cake produced by the additive is too slow to form.

Another class of materials used to control fluid loss are natural and modified polysaccharides such as starch, guar, modified guar and xanthan gums, sometimes combined with pulverulent inorganic solids to achieve more desirable properties. Starches are readily degraded to soluble products after completion of the fracturing process, thereby eliminating the plugging problem. Degradation is accomplished by oxidation, enzymatic hydrolysis or the action of bacteria present in boreholes.

SUMMARY OF THE INVENTION

Blends of modified and natural starches have been found to maintain injected fluid within fractures far more effectively than natural starches. The modified starches, which are the subject of a prior application, include carboxymethyl starch, hydroxyethyl starch, hydroxypropyl starch, acetate starch, sulfamate starch, phosphate starch, nitrogen modified starch, starches crosslinked with aldehydes, epichlorohydrin, borates and phosphates and those grafted with acrylic units, maleic anhydride or styrene. The preferred modified starches are carboxymethyl and hydroxypropyl starch. The natural starches used in blends with modified starches are those derived from corn, potatoes, wheat, rice, soy, tapioca, etc. Preferred are the natural starches of corn, potatoes, wheat and soy; the most preferred is corn starch. Blends are understood to include blends of two or more modified starches as well as blends of natural and modified starches. Optionally, the starches are coated with a surfactant such as sorbitan monooleate, ethoxylated butanol and ethoxylated nonylphenol (or a blend of these materials) at a level of about 0.1 to 10 percent by weight and preferably 0.5 to 5 percent to aid dispersion into the fracturing fluid.

When a blend of natural and modified starches is used, the blend should contain a weight ratio between 1:9 and 9:1 of natural starches to modified starches. The preferred ratio is between 3:7 to 7:3 of natural starches to modified starches, and the most preferred compositions thus far contain a weight ratio of about 1:1.

GENERAL PROCESS

There is considerable interest throughout the oil industry in fluid loss additives for hydraulic fracturing which efficiently control the spurt loss and leak off during the fracturing operation and also are soluble or degradable to soluble products under downhole conditions so as to minimize plugging and other damage to productive formations.

The thrust of this invention is an improvement on fluid loss additives comprised of blends of natural and modified starches, the subject of a prior application. This invention entails a fluid loss additive composed of a blend of natural and modified starches which additionally includes an enzyme to aid in the degradation of the fluid loss additive under downhole conditions. Once the enzyme is a part of the composition, the need for injection of a starch degrading agent after fracturing is eliminated. The enzyme is specific for a particular starch blend and will not affect other components of the fracturing fluid. Storage stability of the starch-enzyme fluid loss additive is favorable because the enzyme will not degrade the starches in the dry state.

PRIOR ART

With reference to the prior art, U.S. Pat. No. 4,682,654—Carter et al, issued to Millmaster, discloses the use of enzyme impregnated guar gum in hydraulic fracturing operations. The hydrolytic enzyme Alcalase acts to lower the concentration of undesired insolubles in the guar, thereby lessening the plugging of pores and flow channels within the oil bearing formation. Also, U.S. Pat. No. 4,693,982—Carter et al, issued to Millmaster, discloses a guar gum composition containing one or more hydrolytic enzymes.

East German Patent DD No. 240,905 A1—Haeussler et al discloses the use of a clay-suspension-based drilling fluid containing cold-water-soluble potato starch as a decomposable water loss control agent. Starch deposited in the pores of the subterranean formation is later decomposed by the injection of an alpha and/or beta amylase formulation. East German Patent DD No. 221,791 A2—Gockel et al futher discloses mixing starch and alpha or beta amylase into clay-water suspensions used for drilling water, petroleum and gas wells.

Controlled enzymatic hydrolysis of polysaccharides for improved flowability in enhanced oil recovery operations is disclosed in U.S. Pat. No. 4,326,037—Griffith et al (U.S. Department of Energy). Enzymes other than amylases are used to reduce the average molecular weight of gums and lessen their tendency to plug oil-bearing formations.

DETAILED DESCRIPTION

The subject of the present invention is a fluid loss additive composed of blended natural and modified starches which includes a hydrolytic enzyme blended with the starches in the dry state. In broad aspect, alpha amylase, beta amylase and/or gluco amylase are all generally effective and usable for this invention. The enzyme must be specific for the hydrolysis of starches and inert toward other components of a fracturing fluid, such as guar and modified guar. Starch is composed of glucose units primarily linked by alpha 1,4-glycosidic bonds. Guar and modified guar consist of mannose units linked by beta 1,4-glycosidic bonds. Any enzyme which is specific for the alpha 1,4-glycosidic linkages found in starch is potentially applicable to this invention, although temperature, pH and kinetic factors must be taken into account in selecting the enzyme of choice. Alpha amylases of bacterial and fungal origin such as TENASES and CLARASES (Miles Laboratories, Inc.) are endo-enzymes which randomly hydrolyze interior alpha 1,4-glycosidic bonds of starch. These enzymes have been found suitable in the practice of this invention.

EXAMPLE I

A preferred blended starch fluid loss additive according to our prior application, "Additives and Method for Temporarily Reducing Permeability in Subterranean Formulation", Ser. No. 272,237, filed Nov. 14, 1988, was reformulated to include 0.05 percent alpha amylase (TENASE 1200 or CLARASE 40000, Miles Laboratories, Inc.) as follows:

| Component | Weight Percent |
| --- | --- |
| Pregelatinized corn starch | 29.25 |
| Hydroxypropyl carboxymethyl potato starch | 29.25 |
| Hydroxypropyl distarch phosphate potato starch | 19.50 |
| Soy flour | 19.50 |
| Sorbitan monooleate | 1.25 |
| Ethoxylated butanol | 0.60 |
| Ethoxylated nonyl phenol | 0.60 |
| Alpha amylase | 0.05 |
| | 100.00 |
| Another Preferred Blend | |
| Pregelatinized corn starch | 29.220 |
| Hydroxypropyl distarch phosphate potato starch | 13.640 |
| Fine raw corn starch | 19.480 |
| Wheat Flour | 35.060 |
| Sorbitan monooleate | 1.250 |
| Ethoxylated butanol | 0.875 |
| Polyoxyethylene (5) sorbitan monooleate | 0.375 |
| Alpha amylase | 0.050 |
| Hydrated dolomitic lime | 0.050 |
| | 100.000 |

To test the effectiveness of the formulation in a typical fracturing fluid, equal parts of hydroxypropyl guar (HPG) and the formulated fluid loss additive (FLA) were combined in a background medium of 2 percent potassium chloride at a concentration of 40 pounds per thousand gallons. The pH was adjusted to 5.0 and the gel was hydrated prior to making an initial viscosity measurement. Portions of this fluid were then aged for 24 hours at 75° F. and 115° F. respectively and resulting changes in viscosity were observed as tabulated below:

| Sample | Viscosity, Centipoise | | |
| --- | --- | --- | --- |
| | Initial | 24 hrs at 75° F. | 24 hrs at 115° F. |
| Control (Enzyme absent) | 35 | 35 | 28 |
| HPG/FLA 1:1 | 33 | 32 | 26 |
| TENASE 1200 | | | |
| HPG/FLA 1:1 CLARASE 40000 | 33 | 31 | 17 |

TENASE 1200 (bacterial) has less effect than CLARASE 40000 (fungal) which is the desirable result. TENASE 1200 showed no drop in viscosity, whereas CLARASE 40000 showed a sharp drop in viscosity at 24 hours at 115° F.

EXAMPLE II

To demonstrate the degradation of starch solids under the action of alpha amylase, a preferred blended starch fluid loss additive (FLA) according to our prior application, "Additives and Method for Temporarily Reducing Permeability in Subterranean Formulation", Ser. No. 272,237, filed Nov. 14, 1988, was dispersed in 2 percent potassium chloride solution at a nominal concentration. This dispersion was compared in an aging study with a dispersion of similar concentration using the reformulated enzyme-containing FLA of Example 1. Aliquots of the aged dispersions were filtered and the residue dried and weighed to obtain the data below:

| Time hrs | Temperature (°F.) | Solids, Percent Residue | |
| --- | --- | --- | --- |
| | | FLA (Blank) | FLA With Enzyme |
| 24 | 85 | 47 | 44 |
| 72 | 85 | 37 | 18 |
| 120 | 85 | 31 | 7 |
| 168 | 85 | 26 | 3 |
| 24 | 125 | 38 | 23 |
| 24 | 150 | 25 | 14 |
| 24 | 180 | 11 | 5 |

The data demonstrate the activity of the enzyme in hydrolyzing starch solids and also show how the extent of the reaction varies as a function of time and temperature.

EXAMPLE III

Earthen cores were used to simulate use of the preferred blended starch/enzyme FLA (Example 1) under field conditions. A reference fluid, used as a blank, contained 20 pounds per thousand gallons of hydroxypropyl guar only. The test fluid contained the same concentration of hydroxypropyl guar plus 50 pounds per thousand gallons of the subject FLA.

Fluid loss measurements were made as a function of time at an applied pressure of 1000 psi. Spurt loss is expressed in gallons per square foot.

| Time Min. | Fluid loss Ml. at 1,000 psi | |
| --- | --- | --- |
| | Blank | FLA |
| 1 | 2.6 | 1.6 |
| 4 | 3.2 | 1.8 |
| 9 | 3.8 | 2.0 |
| 16 | 4.4 | 2.1 |
| 25 | 5.2 | 2.2 |
| 36 | 6.0 | 2.4 |
| Spurt, gal/ft$^2$ | 0.088 | 0.035 |
| $C_w$ (ft/min$^{\frac{1}{2}}$) | 0.0029 | 0.00064 |
| Initial core permeability (millidarcy) | 0.2 | 0.1 |

| Time | Fluid loss Ml. at 1,000 psi | |
| --- | --- | --- |
| Min. | Blank | FLA |
| Regained permeability | 50% | 100% |

These results demonstrate the effect of the fluid loss agent on factors related to permeability.

We claim:

1. In oil well down hole bore treatment, a method of treating subterranean formations which entails the addition of an effective concentration, for the purpose of hydraulic fracturing, of guar or modified guar as a viscosity modifier, starch and an enzyme which degrades the alpha linkage of the starch but does not affect the beta linkage of guar, and modified guar.

2. In oil well down hole bore treatment, a method of treating subterranean formations by the addition of an effective concentration, for the purpose of hydraulic fracturing, of natural and modified starches and an enzyme which degrades the alpha linkages in the starches.

3. According to claim 2, a method of treating subterranean formations by the addition of an effective concentration, for the purpose of hydraulic fracturing, of a mixture of natural starches and an enzyme capable of degrading the alpha linkage of the starch.

4. According to claim 2, a method of treating subterranean formations by the addition of an effective concentration, for the purpose of hydraulic fracturing, of a mixture of modified starches and an enzyme capable of degrading the alpha linkage of the starches.

5. An enzymatically degradable fluid loss additive consisting of a mixture of natural and modified starches in a ratio of about 9:1 to 1:9, and an alpha linkage enzyme.

6. According to claim 5, an enzymatically degradable fluid loss additive consisting of natural starch and a mixture of modified starches in a ratio of about 7:3 to 3:7, and an alpha linkage enzyme.

7. An enzymatically degradable fluid loss additive consisting of guar or modified guar as a viscosity modifier, a mixture of modified starches and an enzyme which degrades the alpha linkage of starch but does not affect the beta linkage of any guar or modified guar.

8. According to claim 7, an enzymatically degradable fluid loss additive consisting of guar or modified guar as a viscosity modifier, a mixture of modified starch and an enzyme selected from one member of a group consisting of alpha amylase, beta amylase and gluco amylase, which degrades the alpha linkage of starch but does not affect the beta linkage of any guar or modified guar.

9. According to claim 8, a fluid loss additive consisting of guar or modified guar as a viscosity modifier, a mixture of modified starch and an enzyme consisting of alpha amylase.

10. According to claim 8, a fluid loss additive consisting of guar or modified guar as a viscosity modifier, a mixture of modified starch and an enzyme consisting of beta amylase.

11. According to claim 8, a fluid loss additive consisting of guar or modified guar as a viscosity modifier, a mixture of modified starch and an enzyme consisting of gluco amylase.

* * * * *